UNITED STATES PATENT OFFICE.

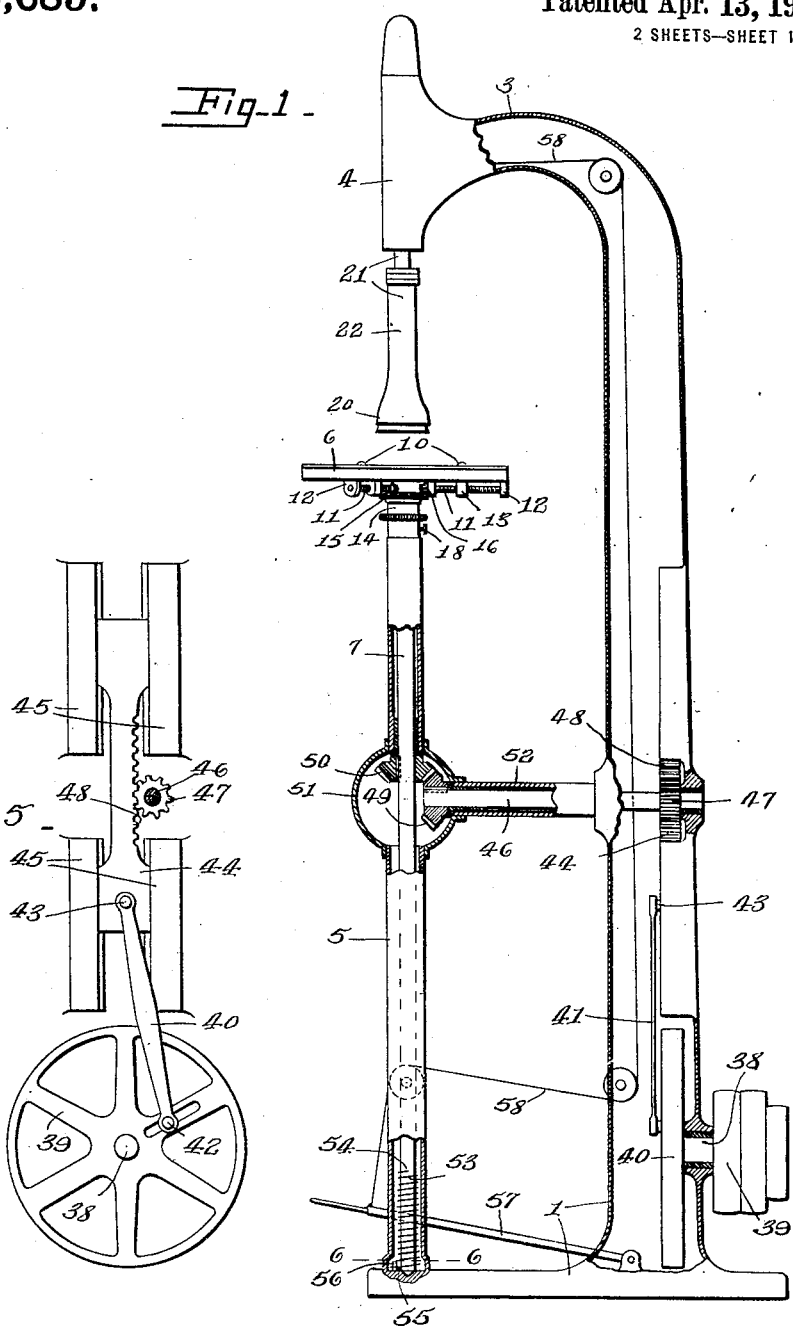

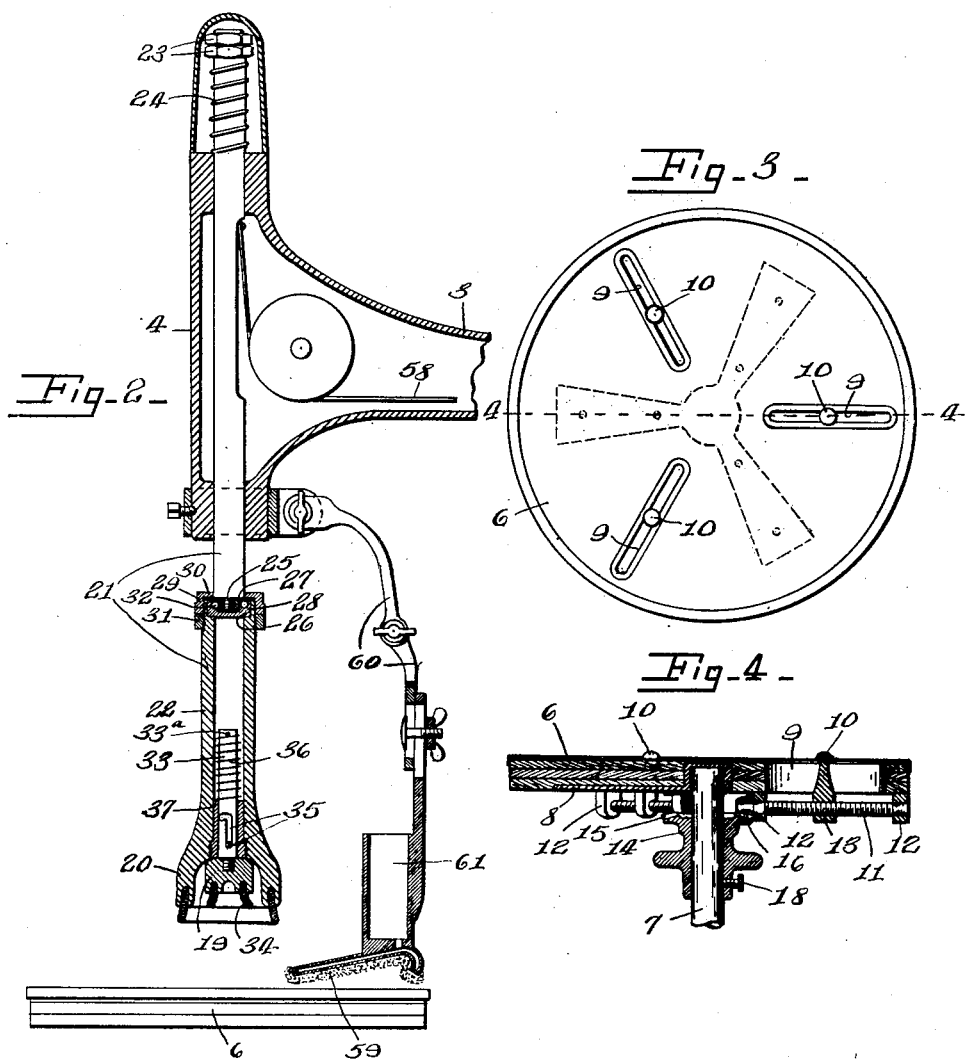

PAUL M. DISINGER, OF SYRACUSE, NEW YORK.

CHINA-BURNISHING MACHINE.

1,336,685.

Specification of Letters Patent. Patented Apr. 13, 1920.

Application filed August 26, 1916. Serial No. 117,087.

*To all whom it may concern:*

Be it known that I, PAUL M. DISINGER, a citizen of the United States, residing at Syracuse, in the county of Onondaga and State of New York, have invented a certain new and useful China-Burnishing Machine, of which the following is a specification.

This invention has for its object the production of a burnishing machine particularly applicable for polishing or burnishing the ornamental work on china, and the invention consists in the novel combinations and constructions hereinafter set forth and claimed.

In describing this invention, reference is had to the accompanying drawings, in which like characters designate corresponding parts in all the views.

Figure 1 is an elevation, partly in section, parts being omitted, of a preferable embodiment of my invention.

Fig. 2 is an enlarged detail view showing in section the pressure feet, plunger supporting the same and contiguous parts, and also the parts omitted in Fig. 1.

Fig. 3 is a plan view of the table.

Fig. 4 is a sectional view on line 4—4, Fig. 3.

Fig. 5 is a detail view of a portion of the actuating means.

Fig. 6 is a sectional view on line 6—6, Fig. 1.

This burnishing machine comprises, generally a table movable about an axis, means for centering the article on the table, and means for holding the article on the table.

1 designates the frame of the machine, which is here shown as composed of a base, a hollow upright arm 2 rising from the base and having, near the upper end thereof, a forwardly extending arm 3 which supports a bearing 4, and a standard 5 rising from the base in front of the arm 2 and suitably connected thereto.

6 is the table which is mounted on a vertical shaft 7 suitably journaled in the standard 5 and is usually stepped in the base 1. The table is here shown as composed of a suitable frame 8 on which is mounted the body comprising a layer or layers of wood, the upper face of the table being covered by a sheet of rubber or other material upon which the china article rests. The table is also formed with radial slots 9 therein.

The means for centering the article on the table comprises a plurality of heads 10 movable in the slots 9, elements, as radially extending screws 11, supported in lugs 12 depending from the table, the screws 11 threading into blocks 13 at the lower ends of the heads 10 and an operating member 14 common to all of the screws. The operating member is here shown as mounted upon the shaft 7 and as having a bevel gear 15 at its upper end and meshing with bevel pinions 16 on the inner ends of the screws 11. The operating member is held in its adjusted position by a set screw 18, and bears at its lower end on the upper end of the standard 5. The heads 10 are spherical or rounding in order to find a bearing on the bottom of the china article.

The means for holding the article on the table includes a pressure foot and as here shown, there are two pressure feet, one located concentric with the other.

19, 20 designate the pressure feet, which are carried by a suitable plunger 21, supported in the bearing 4 and extending above the same, the plunger 21 consisting of lower and upper sections. The lower section 22 is rotatably connected to the upper, and carries the pressure feet. The upper section is mounted in the bearing 4 and has a shoulder, as a nut or nuts 23, at its upper end between which and the upper end of the bearing 4, a compression spring 24 is located.

The sections are connected together by a suitable coupling. As here illustrated, the opposing ends of the sections are formed respectively, with a reduced threaded stem 25, and a socket 26, and on the stem 25 is threaded a thrust bearing member 27, and in the socket 26 is pressed a bearing member 28. The upper end of the lower section 22 is threaded and a collar 29 threads thereon, said collar having an inturned flange 30, lapping the upper surface of the bearing member 27 on the upper section, the bearing member 27 being of greater diameter than the plunger so that the margin of the upper end thereof projects beyond the periphery of the plunger. A lock nut 31 threads on the plunger section 22 against the collar 29. Anti-friction members 32 are arranged between the bearing members 27, 28.

Each pressure foot consists of an annular flexible band secured to the body of the foot at one edge and having its other edge free and located to yieldingly engage the upper face of the china article on the table. The foot 19 comprises a stem 33 which extends into an axial passage opening through the lower end of the plunger section 22. The inner pressure foot 19 is normally arranged with its advance or lower end 34 above, or in the rear of, the advance end of the pressure foot 20 and is adjustable to a point in which its advance end is held below or in front of the advance end of the outer pressure foot 20.

As here shown, the stem 33 of the inner pressure foot is connected to the plunger section 22 by a bayonet joint 35, and usually a spring 36 encircles the upper end of the stem 33 and tends to draw the stem upwardly, this spring being interposed between an internal shoulder 37 in the axial passage of the plunger section 22, and a shoulder 33ª at the upper end of the stem.

The means for oscillating the table 6 comprises a driving shaft 38 journaled in a suitable bearing near the lower end of the upright arm 2 and having power receiving means 39 at its outer end, a wheel 40 on the inner end of the shaft, a connecting rod 41 mounted at one end on an eccentric pin 42 associated with the wheel 40 and at its other end at 43 connected to a slide 44 movable in suitable ways 45 in the frame, and a shaft 46 having a pinion 47 at one end meshing with a rack 48 formed on said slide 44 and having a bevel gear 49 at its other end which meshes with a beveled pinion 50 on the shaft 7. The pinions 49, 50 are housed in an enlarged portion 51 of the upright, and the shaft is incased in a tube 52 connecting the arms 2, 5. The eccentric pin 42 is adjustable radially of the wheel 40 to regulate the extent of the oscillation of the table. In order to prevent chucking during the change of direction of movement of the table during each oscillation thereof due to lost motion in the power transmitting connections, a spring is arranged to take up any lost motion. As illustrated, a spring 53 is connected to the shaft 7 to act alternately in opposite directions thereon at the end of the rocking movements of the shaft. Said spring 53 is connected at one end at 54 to the shaft 7, and at its other end at 55, abuts against a pin or shoulder 56 on the base 1. During rocking movement of the shaft 7 in one direction the arm 55 of the spring separates from the shoulder 56 and moves around the shaft 7 until it strikes the other side of said shoulder so that continued movement of the shaft 7 slightly tensions the spring to take up any lost motion when the shaft begins its rocking in the opposite direction. When during such movement of the shaft 7 in the opposite direction, the force of the spring is expended, the arm 55 separates from the shoulder 56 and moves until it reaches its starting position and is again tensioned in the reverse direction.

Obviously, during the rotation of the shaft 38 a reciprocating motion will be given to the slide 44 which is converted into an oscillating movement by reason of the rack 48 and pinion 47.

The plunger 21 is moved vertically by means of a pedal lever 57 which is connected to the plunger 21 by means of a cable 58 passing over suitable pulleys, a portion of this cable passing upwardly through the upright 2 and the arm 3 thereof, and the upper end of the cable being connected to the plunger 21 to pull downwardly thereon, and move the plunger against the action of the spring 24 when the pedal is depressed. When one or the other of the pressure feet 19, 20 engages with the article on the table, the oscillating motion of the table is transferred to this foot. The throw of the plunger 21 is sufficient to permit shallow and deep china articles to be placed on the table. A wiper 59 of sponge or other material may be supported by an adjustable bracket 60 supported by the bearing 4 and arranged to engage the rim of the piece of china on the table and wipe off the sand or other burnishing material therefrom. A container 61 for water serves to moisten the sponge.

In operation, the china article, the decoration of which is to be burnished or polished, is placed on the table 6 and the heads 10 adjusted to engage the annular bead usually present on the bottom of such article, and the pressure foot depressed and held depressed by the pedal 57 and during the oscillating motion of the table, the operator burnishes the decorations with a suitable burnishing tool or by sand applied by hand or a cloth. In case of large articles, the pressure foot 20 is used, but when smaller articles are used, the inner pressure foot is moved outwardly by reason of the bayonet joint. China articles are polished or burnished in groups and the heads 10 are adjusted to receive the articles of the group and when once adjusted do not have to be moved until another group of articles are to be operated on.

This machine is particularly advantageous in that the table has an oscillating movement, and the article being polished or burnished during the oscillations thereof. It is further advantageous in that owing to the manually operated pressure foot, the article can be quickly placed in position and removed.

What I claim is:—

1. A china burnishing machine comprising a table movable about an axis, means movable toward and from the face of the table for engaging the upper face of the article thereon and holding the article on the table, and means associated with the table for centering the article held by the former means, substantially as and for the purpose specified.

2. A china burnishing machine comprising a table movable about an axis and means movable toward and from the face of the table for engaging the upper face of the article thereon and holding the article on the table, the latter means being also movable about an axis, substantially as and for the purpose set forth.

3. A china burnishing machine comprising a table movable about an axis, and means for holding the article on the table, said means being movable about an axis and engaging the upper face of the article, and means by which the holding means is held by the operator against the article, substantially as and for the purpose specified.

4. A china burnishing machine comprising a table movable about an axis, a pressure foot arranged coaxially with the table and means for moving the pressure foot toward the table, substantially as and for the purpose set forth.

5. A china burnishing machine comprising a table movable about an axis, a pressure foot arranged coaxially with the table, and means for moving the pressure foot toward the table, said means being actuated by the operator, substantially as and for the purpose described.

6. A china burnishing machine comprising a table movable about an axis, means for centering the article on the table including a plurality of radially adjustable heads and a common actuator for all of said heads, substantially as and for the purpose specified.

7. A china burnishing machine comprising a table movable about an axis, means for centering the article on the table comprising a plurality of radially adjustable heads, elements connected to said heads to move the same radially, and a common actuator for all of said elements mounted concentrically with the axis of the table beneath the same, substantially as and for the purpose set forth.

8. A china burnishing machine comprising an oscillating table movable about an axis, and means for oscillating the table about its axis, substantially as and for the purpose described.

9. A china burnishing machine comprising an oscillating table movable about an axis, means for holding the article on the table, said means being movable toward and from said article, said means being oscillatory about an axis in alinement with the axis of the table, and means for oscillating the table, substantially as and for the purpose described.

10. A china burnishing machine comprising an oscillating table movable about an axis, means for holding the article on the table, said means being movable toward and from the table, the latter means being oscillatory about an axis in alinement with the axis of the table, means for oscillating the table, and means for moving the holding means toward and from the table, substantially as and for the purpose set forth.

11. A china burnishing machine comprising an oscillating table, a rotary actuating part, power transmitting connections between the actuating part and the table to oscillate the same, and a spring means arranged to take up lost motion in said connections during the change in the direction of movement of the table, substantially as and for the purpose specified.

12. A china burnishing machine comprising a table, means for holding the article on the table comprising vertically movable pressure feet arranged coaxially with the table, the pressure feet being arranged concentrically with each other, and one being normally in advance of the other, and the latter being adjustable to occupy a position in advance of the former, substantially as and for the purpose set forth.

13. A china burnishing machine comprising a table for supporting the article, a plunger arranged coaxially with the table and movable toward and from the same, pressure feet mounted concentrically with each other on the plunger, one of the pressure feet being normally arranged with its advance edge in front of the advance edge of the other, and the latter being adjustable to a position in which its advance edge is in front of the advance edge of the former, substantially as and for the purpose described.

14. A china burnishing machine comprising a table movable about an axis, means for holding the article on the table including a part arranged coaxially with the axis of the table, and movable about its axis by the article on the table, means for actuating the table, and means controlled by the operator for pressing the holding means into engagement with the article, substantially as and for the purpose specified.

15. A china burnishing machine comprising a frame, a table movable about an axis supported by the frame, means for holding the article on the table arranged above the table and movable toward and from the same into engagement with the article thereon, said means including a pressure foot movable about an axis arranged concentrically with the axis of the table, a lever, connections between the lever and the pressure foot to move the same downwardly, and actuating means for the table, substantially as and for the purpose set forth.

16. A china burnishing machine comprising a table movable about an axis, a plunger movable toward and from the table and arranged coaxially therewith, and including upper and lower sections, the lower section being rotatably connected to the upper section, a pressure foot carried by the lower section, means for moving the plunger downwardly to engage the pressure foot with the article on the table, and means for actuating the table, substantially as and for the purpose described.

17. A china burnishing machine comprising a table movable about an axis, and a plunger arranged above the table and movable vertically toward and from the same including a rotatable section, and inner and outer pressure feet, one mounted on the rotatable section and the other having a stem extending axially into said section, one of said sections being adjustable axially, substantially as and for the purpose specified.

18. A china burnishing machine comprising a table movable about an axis, and a plunger arranged above the table and movable vertically toward and from the same and including a rotatable section, and inner and outer pressure feet, one mounted on the rotatable section and the other having a stem extending axially into said section, the inner pressure foot being adjustable axially of the plunger, substantially as and for the purpose set forth.

19. A china burnishing machine including a base, and front and rear uprights rising from the base, the rear upright projecting above the front upright and having a forwardly extending arm at its upper end, a bearing supported by said arm in alinement with the front arm, a rotatable table having a shaft extending into the front arm, a plunger slidably mounted in said bearing and having a rotatable pressure foot opposed to the table and movable vertically toward and from the table, a lever, connections between the lever and the plunger to move the same downwardly, said connections extending along the rear upright, actuating means supported by the rear arm, and power transmitting connections between the actuating means and the shaft of the table, substantially as and for the purpose described.

In testimony whereof, I have hereunto signed my name at Syracuse, in the county of Onondaga, and State of New York, this 29th day of July, 1916.

PAUL M. DISINGER. [L. S.]